US012374776B2

(12) United States Patent
Subramanya et al.

(10) Patent No.: US 12,374,776 B2
(45) Date of Patent: Jul. 29, 2025

(54) ENCAPSULATED WIRELESS ANTENNA FOR REDUCING THE IMPACT OF RADIO FREQUENCY INTERFERENCE

(71) Applicant: Intel Corporation, Santa Clara, CA (US)

(72) Inventors: Bala Subramanya, Bangalore (IN); Prakash Kurma Raju, Bangalore (IN); Jayprakash Thakur, Bangalore (IN); Zaman Zaid Mulla, Mumbai (IN); Praveen Kumar, Bangalore (IN); Yagnesh Vinodrai Waghela, Bangalore (IN); Maruti Tamrakar, Chhattisgarh (IN); Prasanna Pichumani, Bangalore (IN); Harry Skinner, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 189 days.

(21) Appl. No.: 18/361,952

(22) Filed: Jul. 31, 2023

(65) Prior Publication Data

US 2025/0046983 A1 Feb. 6, 2025

(51) Int. Cl.

| | |
|---|---|
| ***H01Q 1/22*** | (2006.01) |
| ***H01Q 1/40*** | (2006.01) |
| ***H01Q 1/48*** | (2006.01) |
| ***H01Q 1/52*** | (2006.01) |

(52) U.S. Cl.

CPC ............. *H01Q 1/2266* (2013.01); *H01Q 1/40* (2013.01); *H01Q 1/48* (2013.01); *H01Q 1/52* (2013.01)

(58) Field of Classification Search

CPC .......... H01Q 1/2266; H01Q 1/40; H01Q 1/48; H01Q 1/52; H01Q 1/243

See application file for complete search history.

(56) References Cited

U.S. PATENT DOCUMENTS

| | | | | |
|---|---|---|---|---|
| 10,061,947 | B2 * | 8/2018 | Duca | G06K 19/07728 |
| 10,431,869 | B2 * | 10/2019 | Samardzija | H01Q 1/002 |
| 2009/0128263 | A1 * | 5/2009 | Hesselbarth | H01P 7/04 29/829 |
| 2018/0076529 | A1 * | 3/2018 | Minard | H01Q 1/243 |
| 2023/0187812 | A1 * | 6/2023 | Lee | H01L 23/66 343/700 MS |

* cited by examiner

*Primary Examiner* — Seung H Lee

(74) *Attorney, Agent, or Firm* — VIERING, JENTSCHURA & PARTNER mbB

(57) ABSTRACT

Disclosed herein is an encapsulated antenna for reducing the impact of radio frequency interference (RFI) that may couple to the antenna at frequencies within the Wi-FI 5/6e bandwidths. The encapsulated antenna device may include an insulating housing and a metal layer arranged within a cavity of the housing. The encapsulated antenna device also includes an antenna device comprising a ground terminal and an antenna body, wherein the ground terminal is connected to the metal layer, wherein the antenna body is arranged above the metal layer and within the cavity. The encapsulated antenna device also includes a spacer between the metal layer and the antenna body that provides an offset distance between the metal layer and the antenna body.

20 Claims, 6 Drawing Sheets

ENCAPSULATED WIRELESS ANTENNA FOR REDUCING THE IMPACT OF RADIO FREQUENCY INTERFERENCE

TECHNICAL FIELD

This disclosure relates generally to wireless antennas, and in particular, shielding wireless antennas from radio frequency interference.

BACKGROUND

In computing systems such as with desktop computers or workstation computers (generally, PCs), it may be challenging to integrate a wireless antenna intended for high-frequency bands, such as the Wi-Fi 6E frequency band (e.g., 6-7.1 GHZ), due to strong sources of radio frequency (RF) interference (RFI) originating from the computing system itself and impacting the performance of the wireless antenna in the high-gigahertz frequency ranges. For example, the memory subsystem, such as a double-data rate 5 (DDR5) random access memory (RAM), of the computing system may generate RF noise that couples as RFI in the Wi-Fi 6E frequency band. Often, an external antenna may be used to integrate an existing computing system to support Wi-Fi 6E transmissions, but even in an external implementation, RF noise generated by the computing system may leak through the chassis (e.g., through vent holes/panel openings) and interfere with an externally-connected antenna. Shielding is often used to reduce leakage, but chassis-level shielding may negatively impact thermals of the system and the overall bill-of-materials (BOM) costs.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
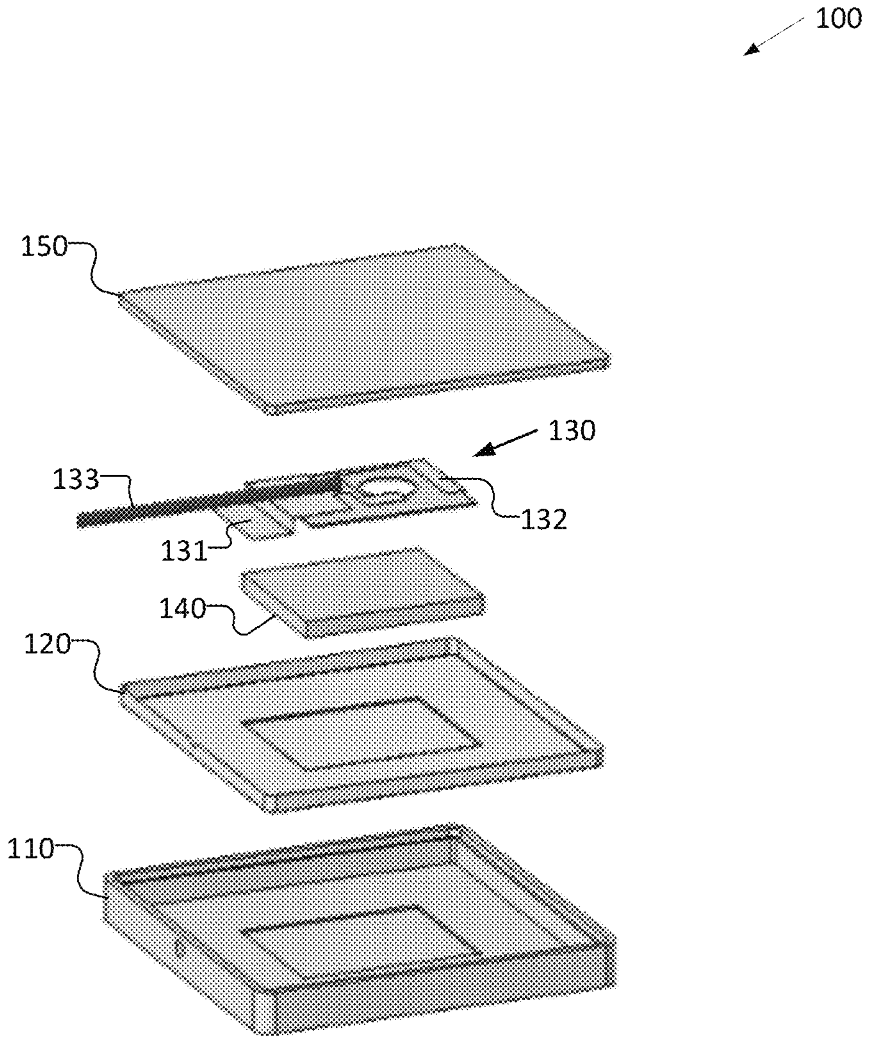
FIG. 1 shows an exploded view of an exemplary encapsulated antenna as disclosed herein.

The following detailed description refers to the accompanying drawings that show, by way of illustration, exemplary details and features.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, “memory” is understood as a computer-readable medium (e.g., a non-transitory computer-readable medium) in which data or information can be stored for retrieval. References to “memory” included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term “software” refers to any type of executable instruction, including firmware.

Unless explicitly specified, the term “transmit” encompasses both direct (point-to-point) and indirect transmission (via one or more intermediary points). Similarly, the term “receive” encompasses both direct and indirect reception. Furthermore, the terms “transmit,” “receive,” “communicate,” and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radio frequency (RF) transceivers and antennas, and the logical transmission and reception over the software-level connection is performed by the processors or controllers. The term “communicate” encompasses one or both of transmitting and receiving, i.e., unidirectional or bidirectional communication in one or both of the incoming and outgoing directions. The term “calculate” encompasses both “direct” calculations via a mathematical expression/formula/relationship and ‘indirect’ calculations via lookup or hash tables and other array indexing or searching operations.

As noted above, it may be challenging to integrate into existing computing systems a wireless antenna intended to operate at high-frequency bands, such as the Wi-Fi 6E frequency band (e.g., 6-7.1 GHZ), due to strong sources of radio frequency (RF) interference (RFI) originating from the computing system itself. For example, the memory subsystem, such as a double-data rate 5 (DDR5) random access memory (RAM), of the computing system may generate RF noise that couples as RFI in the Wi-Fi 6E frequency band. This RFI may impact the performance of the wireless antenna, especially in the high-gigahertz frequency ranges. A complex, gasketed shield between the chassis and antenna may help reduce RFI impact, but this may be costly and reduce air flow through the chassis, causing thermal issues. Alternatively, the sources of RFI may be adjusted (e.g., the DDR5 frequency may be reduced), but this may have a negative impact on the computing capability of the computing system.

The disclosed encapsulated antenna discussed more detail below may help reduce the impact of RFI on the antenna without having to use a complex, gasketed shield between the chassis and antenna and without having to reduce the computing capability of the computing system. The disclosed encapsulated antenna may be enclosed in a non-conductive (insulating) housing that isolates the antenna ground from the chassis ground. A metal layer may be formed inside the non-conductive housing (e.g., in a cavity), and the ground of the antenna may be connected to the metal layer and the body of the antenna may be spaced above the metal layer. A non-conductive (insulating) spacer may be used to provide the spacing between the metal layer and the antenna body. A non-conductive (insulating) lid may engage with the non-conductive housing to enclose (encapsulate) the antenna within the cavity of the non-conductive housing. The encapsulated antenna then be connected via an RF port to the antenna port on the chassis. A mounting device (e.g., a fastener, a hook, a bolt, a screw, a latch, a press-fit, an adhesive, etc.) may be used to secure the encapsulated antenna, via the non-conductive housing, to the chassis. The encapsulated antenna may provide a significant reduction in RFI (e.g., a 10 dB reduction) as compared to conventional methods while providing an RFI solution that is low-cost, portable, easy-to-integrate into existing computing systems, without impacting the thermals of the computing system and without having to reduce the computing capability of the computing system.

FIG. 1 shows an example exploded view of an encapsulated antenna 100 (an exploded stack that starts from the bottom of the page view and is exploded upwards toward the top of the page view). The encapsulated antenna 100 may include a housing 110 made from an insulating material such as a non-conductive plastic. The housing 110 may be tray-shaped such that a cavity is formed within the housing (e.g., housing 110 may include a base surrounded by a wall that extends away from the base to provide the depth of the cavity). A metal layer 120 (e.g., a metal barrier) may be placed inside the cavity of housing 110 (in the exploded view of FIG. 1, the metal layer 120 is stacked above the floor of the cavity of housing 110 on which the metal layer 120 would be placed).

The metal layer 120 may be shaped about the same as the interior cavity of the housing 110 so as to snugly fit within the cavity of the housing 110. The metal layer 120 may also be tray-shaped, similar to the housing 110, where a metal wall extends up the sides of the interior cavity of the housing 110 in which the metal layer 120 is placed. In addition, the metal layer 120 and the housing 110 may be perforated so as to allow airflow into the cavity from outside the housing 110 and through the metal layer 120. A spacer 140 may be placed above the metal layer 120 and inside the cavity (in the exploded view of FIG. 1, the spacer 140 is stacked above metal layer 120 on which the spacer 140 would be placed). The spacer 140 may provide an insulating offset to the antenna structure 130 so that a ground port 131 of the antenna structure 130 may attach to the metal layer 120 while a body 132 of the antenna structure 130 may be placed on the spacer 140 to provide an insulating offset from the metal layer 120 (in the exploded view of FIG. 1, the antenna body 132 is stacked above spacer 140 on which the antenna body 132 would be placed). Spacer 140 may also be made of a non-conductive material and may be made of the same or different material from housing 110. The antenna structure 130 may also have an RF port 133 for connecting to a wireless transceiver (not shown).

The encapsulated antenna 100 may include a cover 150 (e.g., a top lid) that engages with the housing 110 to enclose the antenna structure 130, spacer 140, and metal layer 120 within the cavity of housing 110. In the exploded view of FIG. 1, the cover 150 is stacked above antenna structure 130 above which the cover 150 would be placed. For example, the cover 150 may have a press-fit relationship with the walls of housing 110 so that it may be removably attached to housing 110. As should be appreciated, cover 150 may attach to housing 110 in other ways such as through an adhesive, one ore more fasteners, thermally joining (e.g., melting/welding), etc. so as to enclose the antenna structure 130, spacer 140, and metal layer 120 within the cavity of housing 110. Cover 150 may also be made of a non-conductive material and may be made of the same or different material from housing 110. As with housing 110 and metal layer 120, cover 150 and/or spacer 140 may also be perforated so as to allow airflow through it.

Figure 2:
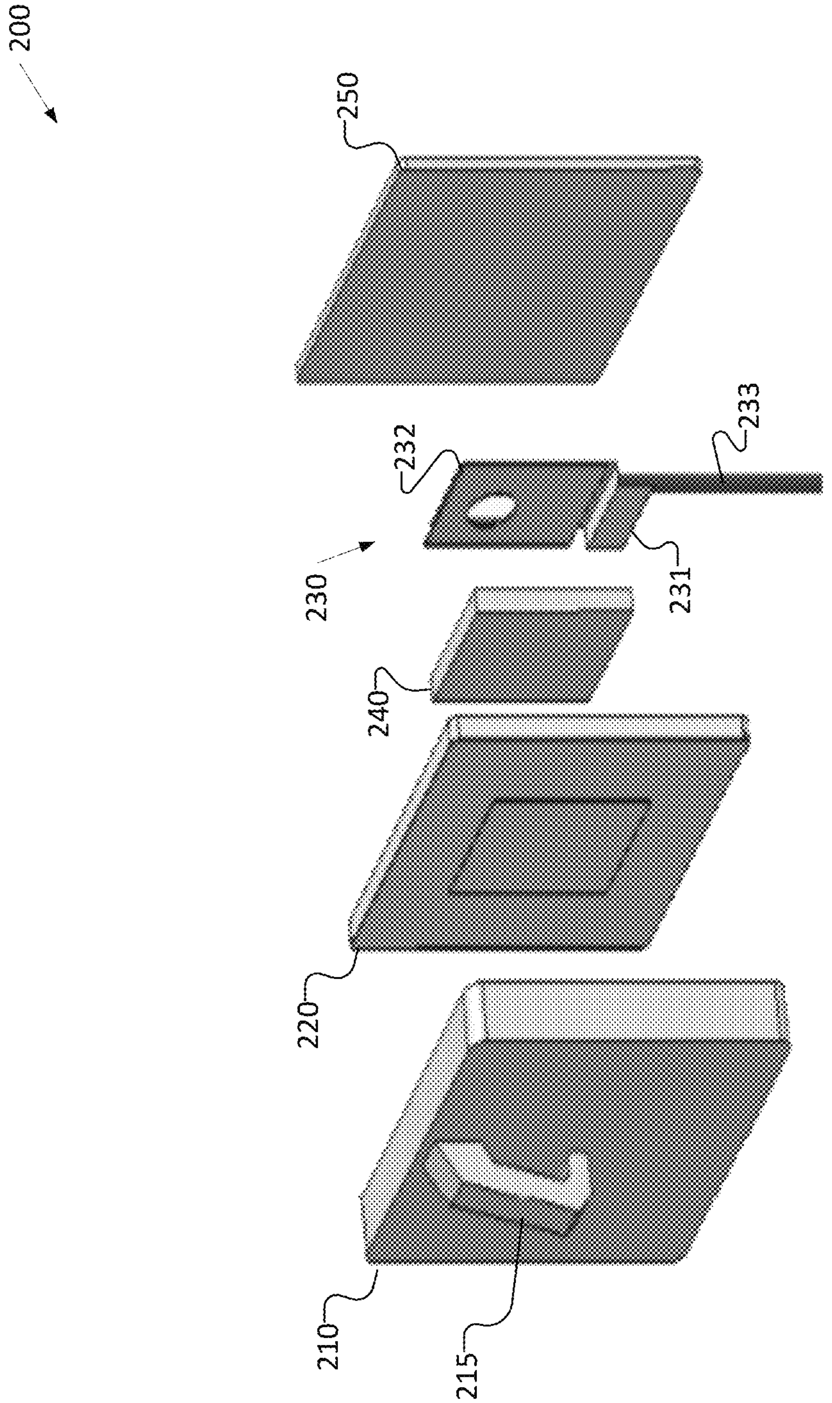
FIG. 2 shows an exploded view from a different perspective of an exemplary encapsulated antenna.

FIG. 2 shows an example exploded view of an encapsulated antenna 200 that is similar to encapsulated antenna 100 of FIG. 1, except the exploded view of FIG. 2 is from a different perspective, showing the bottom of the encapsulated antenna 200 to the left and the stack is exploded rightwards toward the right of the page view. The encapsulated antenna 200 may include a housing 210 made from an insulating material such as a non-conductive plastic, an adhesive (e.g., a non-conductive epoxy), foam, etc. The housing 210 may be tray-shaped such that a cavity is formed within the housing (not visible in the perspective of FIG. 2). The back of housing 210 (in the perspective of FIG. 2, the leftmost side of housing 210) may include a mounting device 215 (e.g., a hook) for attaching the encapsulated antenna to a chassis of a computer system.

A metal layer 220 may be placed inside the cavity of housing 210 (in the exploded view of FIG. 2, the metal layer 220 is stacked to the right of housing 210 within the cavity of which the metal layer 220 would be placed). The metal layer 220 may be shaped about the same as the interior cavity of the housing 210 so as to snugly fit within the cavity of the housing 210. The metal layer 220 may also be tray-shaped, similar to the housing 110. In addition, the metal layer 220 and housing 210 may be perforated so as to allow airflow into the cavity from outside the housing 210 and through the metal layer 220. A spacer 240 may be placed above the metal layer 220 and inside the cavity (in the exploded view of FIG. 2, the spacer 240 is stacked to the right of metal layer 220 on which the spacer 240 would be placed). The spacer 240 may provide an insulating offset to an antenna structure 230 so that a ground port 231 of the antenna structure 230 may attach to the metal layer 220 while a body 232 of the antenna structure 230 may be placed on the spacer 240 to provide an insulating offset from the metal layer 220 (in the exploded view of FIG. 2, the antenna body 232 is stacked to the right of spacer 240 on which the antenna body 232 would be placed). Spacer 240 may also be made of a non-conductive material and may be made of the same or different material from housing 210. The antenna structure 230 may have an RF port 233 for connecting to a wireless transceiver (not shown).

The encapsulated antenna 200 may include a cover 250 that engages with the housing 210 to enclose the antenna structure 230, spacer 240, and metal layer 220 within the cavity of housing 210. Cover 250 may engage with the housing using a press-fit (e.g., engaging the walls of housing 210 so that it may be removably attached to housing 210. As should be appreciated, cover 250 may engage with housing 210 in other ways such as through an adhesive, one ore more fasteners, thermally joining (e.g., melting), etc. so as to attach cover 250 to housing 210 to enclose the antenna structure 230, spacer 240, and metal layer 220 within the cavity of housing 210. Cover 250 may also be made of a non-conductive material and may be made of the same or different material from housing 210. As with housing 210 and metal layer 220, cover 250 and/or spacer 140 may also be perforated so as to allow airflow through it.

Figure 3:
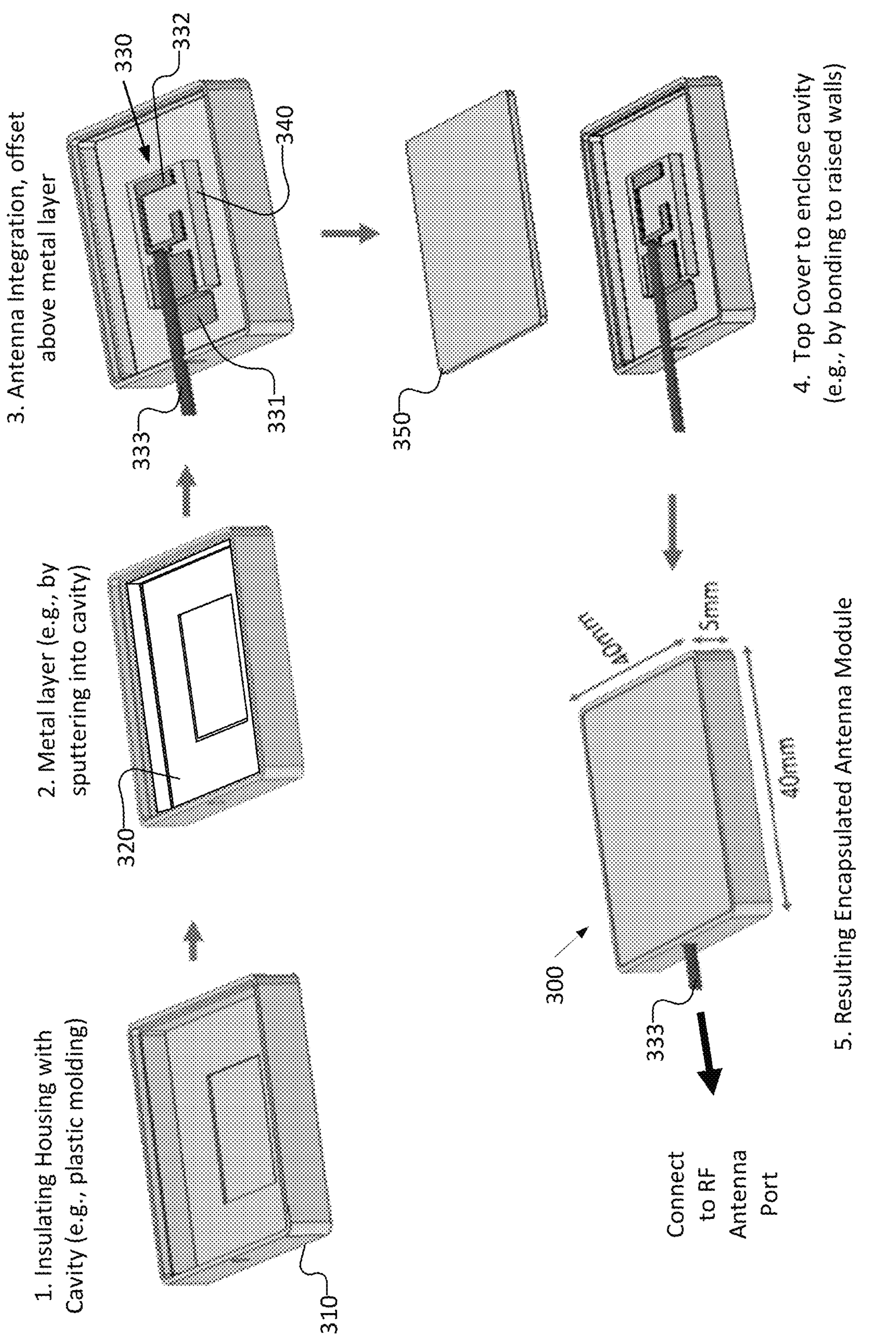
FIG. 3 depicts an exemplary flow for assembling an encapsulated antenna as described herein.

FIG. 3 shows a progression of pictures associated with assembling an encapsulated antenna (e.g., encapsulated antenna 100, 200). At point 1, a housing 310 may be formed from an insulating material. For example, plastic molding (e.g., injection molding) may be used to form housing 310 so that it has a cavity for later receiving a metal layer (e.g., metal layer 320) and an antenna structure (e.g., antenna structure 330). At point 2, a metal layer 320 may be placed within a cavity of housing 310 so as to form a metal barrier on the base (and walls) of the cavity within the housing 310. The metal layer 320 may be inserted into the cavity of housing 310 in any manner. For example, metal layer 320 may be pre-formed and placed into the cavity, metal material may be sputtered into the cavity to form metal layer 320 within the cavity, etc. As should be understood, the metal layer 320 and the housing 310 may be perforated so as to allow airflow into the cavity from outside the housing 310 and through the metal layer 120.

At point 3, a spacer 340 and antenna structure 330 may be placed within the cavity of the housing, above the metal layer 320. A ground port 331 of the antenna structure 330 may be attached to the metal layer 320 and an antenna body 332 of the antenna structure 330 may be placed above the spacer 340 so that spacer 340 provides an insulating offset between metal layer 320 and antenna body 332. An RF port 333 of antenna structure 330 (that provides for an RF connection to a wireless transceiver (non shown)) may be fed through an opening in the housing 310. At point 4, a cover 350 may be attached to housing 310 so as to enclose antenna structure 330 (with spacer 340 and metal layer 320) within the cavity, while the RF port 333 extends outside the cavity (e.g. via an opening in the housing 310 or cover 350. As should be appreciated, cover 350 may engage with housing 310 any manner such as through an adhesive, one ore more fasteners, a press-fit relationship, thermally joining (e.g., melting), etc. so as to attach cover 350 to housing 310. As with housing 310 and metal layer 320, cover 350 and/or spacer 140 may also be perforated so as to allow airflow through it. Point 5 shows the resulting encapsulated antenna 300 that may be connected, via the RF port 333, to an RF antenna port of a wireless transceiver (not shown).

In general, the dimensions of the elements of the encapsulated antenna may vary according to the particular application. For a Wi-Fi antenna that may operate in the Wi-Fi 6E frequency band (e.g., 6-7.1 GHZ), for example, the metal layer (e.g., metal layer 120, 220, 320) may preferably have a length and a width that total at least 80 mm. For example, the length may be 40 mm and the width may be 40 mm (totaling 80 mm), or the length may be 30 mm and the width may be 50 mm (totaling 80 mm), or the length may be 80 mm and the width may be 80 mm (totaling 160 mm), or any other combination of length/width that provides a total of at least 80 mm. To the extent the metal layer includes a metal wall that surrounds the metal layer and extends upward from the metal layer (e.g., like a tray), the metal wall height may be at least as long (e.g., tall) as the offset between the metal layer and the antenna body (e.g., its height is about the same as the thickness of the spacer that creates the offset between as the metal layer and the antenna body. As one example, the offset between the metal layer and the antenna body may be about 5 mm, and the height of the metal wall may be about the same. The thickness of the housing (e.g., the depth of the cavity formed within housing (e.g., housing 110, 210, 220)) should be large enough to be able to enclose the antenna device, metal layer (and metal wall), spacer, etc. within the cavity. In this sense, the wall height of the housing may be also about 5 mm, depending on the thickness of the metal layer, the spacer, and the antenna device.

The encapsulated antenna (e.g., encapsulated antenna 100, 200, 300) may be connected to a RF antenna port of a wireless transceiver. The wireless transceiver may be part of a computing device such as a desktop computer, a personal computer, a server, a workstation, an access point, a router, etc. In addition, the encapsulated antenna may be attached to the chassis of the computer device (e.g., as discussed above, for example, with respect to the mounting device 215 of FIG. 2). Because the housing of the encapsulated antenna is insulating, the ground of the encapsulated antenna will be insulated from the chassis ground and the metal layer may provide protection from RFI from the computing device. As one example, assume that a computing device utilizes a DDR5 RAM, where, with active memory workloads, the computing device produces significant RFI within the Wi-Fi 5/6e bandwidth (especially, for example, around 6.6 GHz). For a conventional Wi-Fi 5/6e antenna attached through the chassis to the wireless transceiver of the computing system, RFI may couple onto a conventional antenna. However, using the encapsulated antenna disclosed above, the amount of RFI that couples onto the antenna may be reduced.

Figure 4:
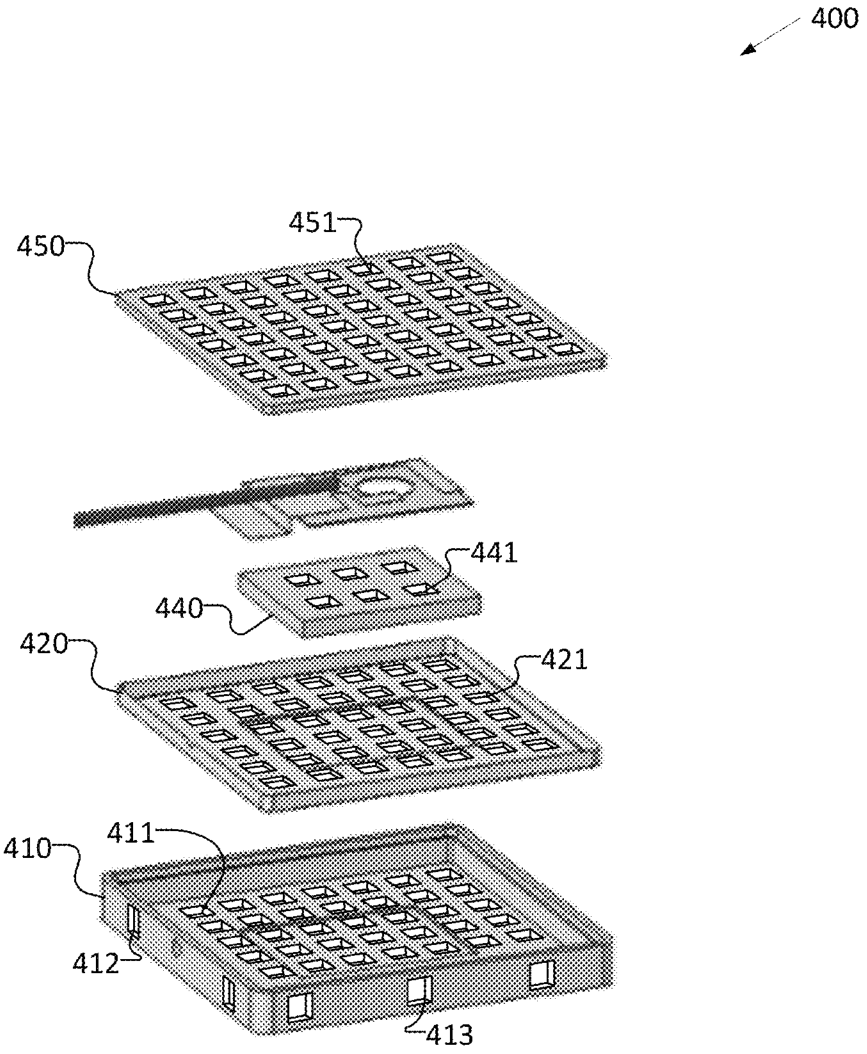
FIG. 4 shows an exploded view of an exemplary encapsulated antenna with perforations in the housing, metal layer, top cover, and spacer.

As noted above, the housing, metal layer, cover, and/or spacer of the encapsulated antenna (e.g., encapsulated antenna 100, 200, and/or 300) may be perforated so as to allow airflow through it. Example perforations are shown in the encapsulated antenna 400 of FIG. 4, which is the same exploded view of the encapsulated antenna 100 of FIG. 1, except that housing 410, metal layer 420, cover 450, and spacer 440 have perforations therethrough. One of the perforations in the cover 450 has been labeled as perforation 451, one of the perforations in the spacer 440 has been labeled as perforation 441, one of the perforations in the metal layer 420 has been labeled as perforation 421, and three of the perforations in the housing 410 have been labeled as perforation 411, perforation 412, and perforation 413. As shown with housing 410, for example, perforations may be in the walls of housing 410 (e.g., perforation 412, 413) and/or the base of housing 410 (e.g., perforation 411). As should be appreciated, the perforations need not be the same shape, be the same size, have the a uniform spacing, be placed in any particular location, or be placed on all components of the encapsulated antenna. Instead, the size, shape, number, and location of perforations may vary according to the desired design (e.g., for a desired air flow and/or an expected attachment point to the chassis).

Figure 5:
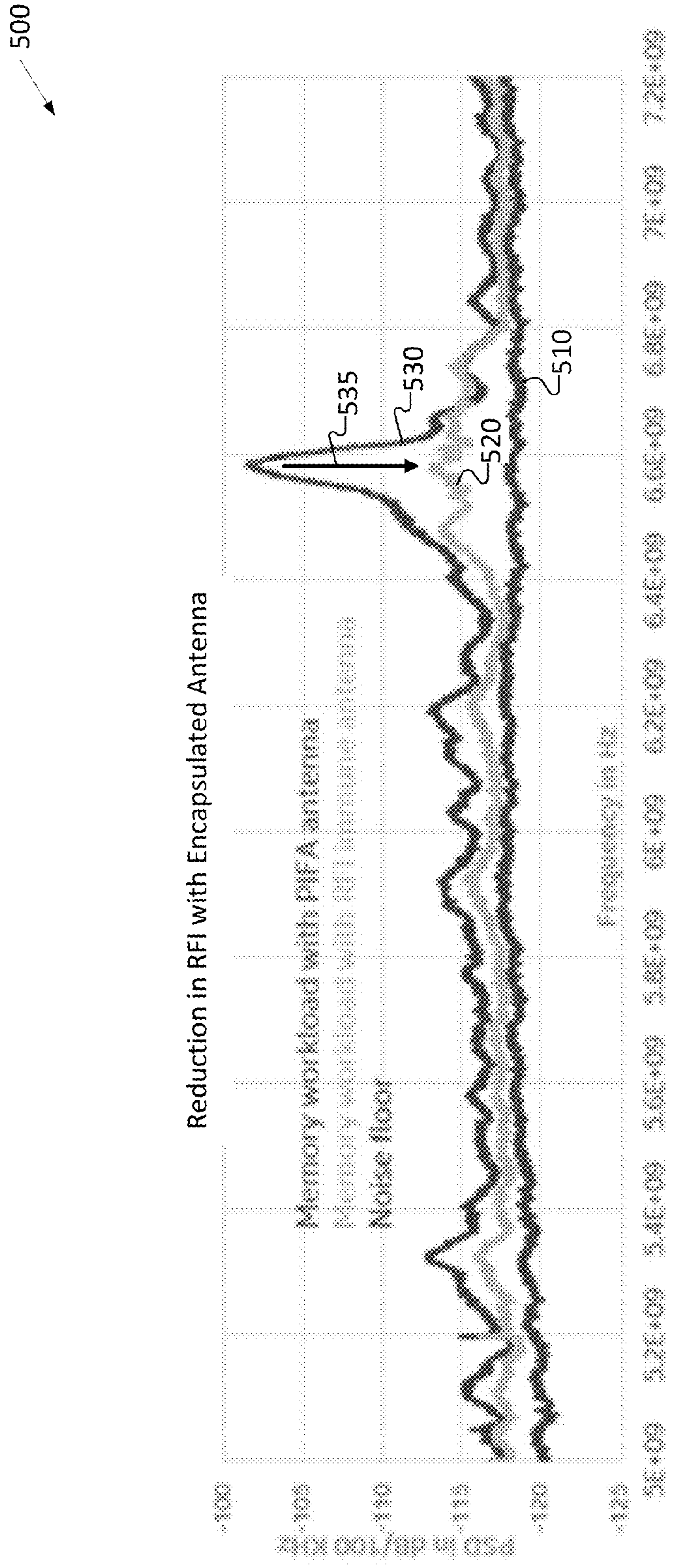
FIG. 5 shows a graph of signal levels from about 5 GHz to about 7.2 GHz for a conventional antenna, an encapsulated antenna as disclosed herein, and a noise floor.

An example of the reduction in RFI that may couple onto the antenna may be seen in FIG. 5, which shows a graph 500 that depicts signal levels within the Wi-Fi 5/6e bandwidth (e.g., from about 5 GHz to about 7.2 GHz). The lower-most signal data 510 shows the noise floor of the antenna under test (e.g., when the computing system is off). The middle signal data 520 shows the signals coupled onto an encapsulated antenna under test (e.g., encapsulated antenna 100, 200, 300) when the computing systems is active (e.g., under DDR5 memory workload). The top signal data 530 shows the signals coupled onto a conventional antenna under test (e.g., one that is not encapsulated as discussed above) when the computing systems is active (e.g., under DDR5 memory workload). As can be seen by error 535, the RFI that couples to the encapsulated antenna is significantly less (e.g., about 10 dB) than that of a conventional antenna. The encapsulated antenna may have, in the frequency range of 2.4 to 2.5 GHZ, an S11 of less than −6 dB, a peak gain of less than 3 dB, and an efficiency of −4.3 dB. The encapsulated antenna may have, in the frequency range of 5.1 to 7.125 GHZ, an S11 of less than −6 dB, a peak gain of less than 5 dB, and an efficiency of −4.5 dB.

Figure 6:
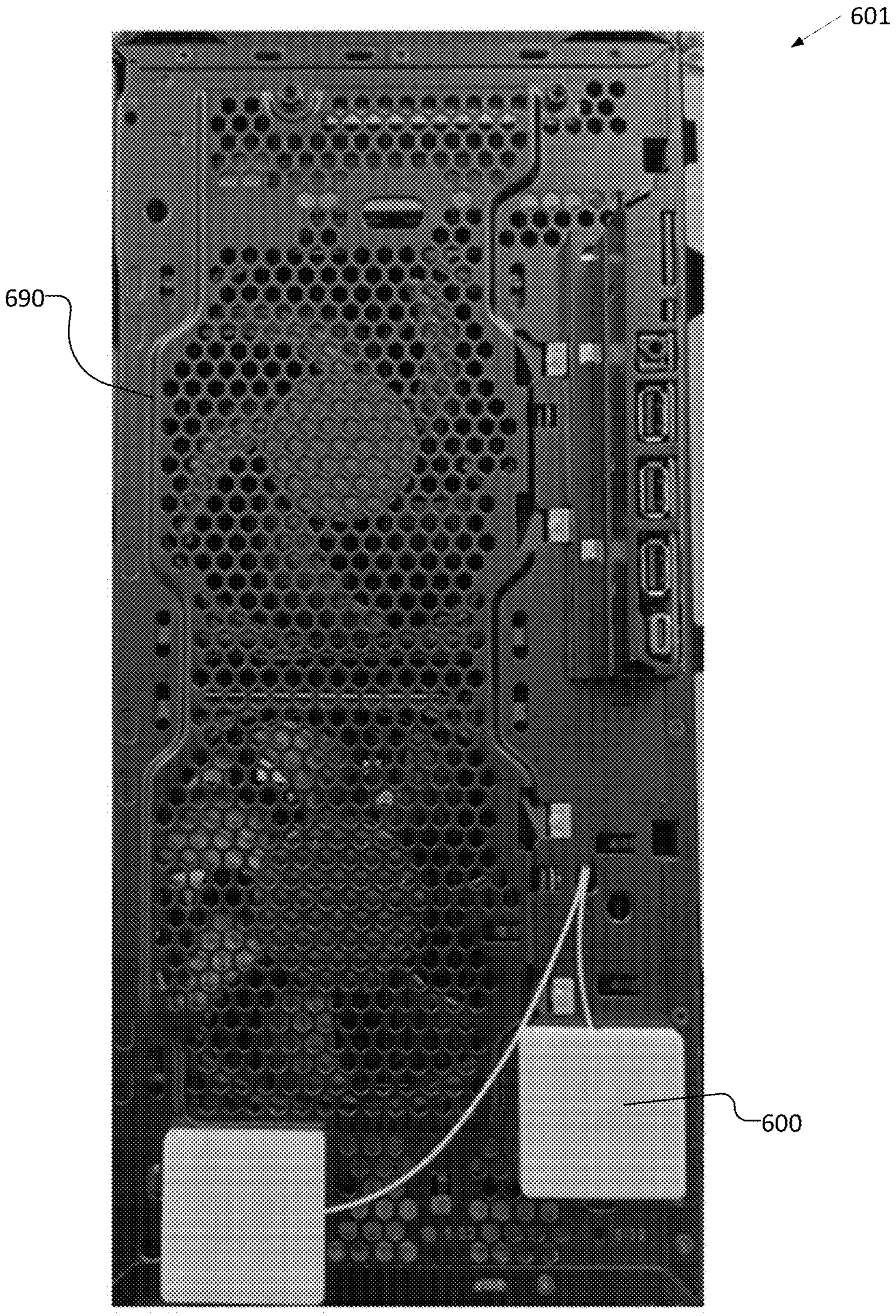
FIG. 6 shows an example of a computing system that includes a chassis, internal to which a wireless transceiver is located and external to which an encapsulated antenna is attached.

FIG. 6 shows an example of computing system 601 that includes a chassis 690, internal to which a wireless transceiver is located, along with the processing systems (e.g., processor, memory, motherboard, input/output modules, etc.). At the chassis 690, an RF port is available for connecting an external antenna to which encapsulated antenna 600 (e.g., encapsulated antenna 100, 200, 300 discussed above) may be connected. The encapsulated antenna 600 may be removably mounted to the chassis 690, e.g., via a mounting device such as a screw, a hook, a bolt, a fastener, a press-fit, an adhesive, etc.

Example 1 is an apparatus including a housing formed from an insulating material. The apparatus also includes a metal layer arranged within a cavity of the housing. The apparatus also includes an antenna including a ground terminal and an antenna body, wherein the ground terminal is connected to the metal layer, wherein the antenna body is arranged above the metal layer and within the cavity. The apparatus also includes a spacer between the metal layer and the antenna body that provides an offset distance between the metal layer and the antenna body.

Example 2 is the apparatus of example 1, wherein the metal layer further includes a metal wall connected to and surrounding the metal layer.

Example 3 is the apparatus of example 2, wherein a height of the metal wall is at least as long as the offset distance.

Example 4 is the apparatus of example 3, wherein the height of the metal wall is about 5 mm.

Example 5 is the apparatus of example 1, wherein the offset distance is about 5 mm.

Example 6 is the apparatus of any of examples 1 to 5, wherein the housing includes a housing base surrounded by a housing wall that together define the cavity.

Example 7 is the apparatus of example 6, wherein the housing further includes a top lid that engages with the housing wall to enclose the cavity.

Example 8 is the apparatus of any of examples 1 to 7, wherein the spacer includes a plastic, a foam, and/or an insulating epoxy.

Example 9 is the apparatus of any of examples 1 to 8, wherein the metal layer is perforated.

Example 10 is the apparatus of any of examples 1 to 9, wherein the housing is perforated.

Example 11 is the apparatus of any of examples 1 to 10, wherein the antenna further includes a radio frequency (RF) port configured to connect to an antenna port of a wireless transceiver.

Example 12 is the apparatus of any of examples 1 to 11, wherein the antenna includes a Wi-Fi antenna (e.g., a WiFi 6e antenna).

Example 13 is the apparatus of any of examples 1 to 12, wherein the antenna is configured to transmit and/or receive RF signals in a frequency range of 5-7 GHZ (e.g., the Wi-Fi 5 and 6E band).

Example 14 is the apparatus of any of examples 1 to 13, wherein the wireless transceiver is a Wi-Fi transceiver (e.g., WiFi 6e).

Example 15 is the apparatus of any of examples 1 to 14, wherein the housing includes a housing base surrounded by a housing wall that together define the cavity, wherein the housing base has a length and a width that together total at least about 80 mm.

Example 16 is the apparatus of example 15, wherein the length is about 40 mm and the width is about 40 mm.

Example 17 is the apparatus of example 15, wherein the length is about 30 mm and the width is about 50 mm.

Example 18 is the apparatus of any of examples 1 to 17, the apparatus further including a mounting device configured to removably attach the housing to a metal chassis of the computing system.

Example 19 is the apparatus of example 18, wherein the mounting device includes a screw, a hook, a bolt, a press-fit, or an adhesive.

Example 20 is a computing system that includes a computing device including a housing and a wireless transceiver, wherein the housing surrounds the wireless transceiver and includes a metal chassis. The computing system also includes an external antenna device that is external to the housing, wherein the wireless transceiver includes a radio frequency (RF) antenna port configured to connect to the external antenna device at the metal chassis. The external antenna device includes an insulating housing configured to attach to the metal chassis. The external antenna device also includes a metal layer arranged within a cavity of the insulating housing, wherein the metal layer is separated from the metal chassis by a base of the insulating housing, wherein the base is surround by a wall that together define the cavity of the insulating housing. The external antenna device also includes an antenna including a ground terminal and an antenna body, wherein the ground terminal is connected to the metal layer, wherein the antenna body is arranged above the metal layer and within the cavity. The external antenna device also includes a spacer between the metal layer and the antenna body that provides an offset distance between the metal layer and the antenna body.

Example 21 is the computing system of example 20, wherein the metal layer further includes a metal wall connected to and surrounding the metal layer.

Example 22 is the computing system of example 21, wherein a height of the metal wall is at least as long as the offset distance.

Example 23 is the computing system of example 22, wherein the height of the metal wall is about 5 mm.

Example 24 is the computing system of example 20, wherein the offset distance is about 5 mm.

Example 25 is the computing system of any of examples 20 to 24, wherein the insulating housing further includes a top lid that engages with the wall to enclose the cavity.

Example 26 is the computing system of any of examples 20 to 25, wherein the spacer includes a plastic and/or an insulating epoxy.

Example 27 is the computing system of any of examples 20 to 26, wherein the metal layer is perforated.

Example 28 is the computing system of any of examples 20 to 27, wherein the insulating housing is perforated.

Example 29 is the computing system of any of examples 20 to 28, wherein the antenna further includes a radio frequency (RF) port configured to connect to the RF antenna port of the wireless transceiver.

Example 30 is the computing system of any of examples 20 to 29, wherein the antenna includes a Wi-Fi antenna (e.g., a WiFi 6e antenna).

Example 31 is the computing system of any of examples 20 to 30, wherein the antenna is configured to transmit and/or receive RF signals from the wireless transceiver in a frequency range of 5-7 GHz (e.g., the Wi-Fi 5 and 6E band).

Example 32 is the computing system of any of examples 20 to 31, wherein the wireless transceiver is a Wi-Fi transceiver (e.g., WiFi 6e).

Example 33 is the computing system of any of examples 20 to 32, wherein the base has a length and a width that together total at least about 80 mm.

Example 34 is the computing system of example 33, wherein the length is about 40 mm and the width is about 40 mm.

Example 35 is the computing system of example 33, wherein the length is about 30 mm and the width is about 40 mm.

Example 36 is the computing system of any of examples 20 to 35, wherein the external antenna device further includes a mounting device configured to removably attach the insulating housing to the metal chassis.

Example 37 is the computing system of example 36, wherein the mounting device includes a screw, a hook, a bolt, a press-fit, or an adhesive.

Example 38 is a method of manufacturing an antenna that includes forming a housing from an insulating material (e.g., via injection molding, etc.), wherein the housing has a cavity. The method also includes forming a metal layer arranged within the cavity of the housing (e.g., by sputtering, deposition, preforming and attaching, etc.). The method also includes attaching a ground terminal of the antenna to the metal layer so that an antenna body of the antenna is above the metal layer (e.g., not contacting the metal layer) and within the cavity. The method also includes placing a spacer between the metal layer and the antenna to provide an offset distance between the metal layer and the antenna body.

Example 39 is the method of example 38, wherein the metal layer further includes a metal wall connected to and surrounding the metal layer.

Example 40 is the method of example 39, wherein a height of the metal wall is at least as long as the offset distance.

Example 41 is the method of example 40, wherein the height of the metal wall is about 5 mm.

Example 42 is the method of example 38, wherein the offset distance is about 5 mm.

Example 43 is the method of any of examples 38 to 42, wherein forming the housing includes forming a housing base surrounded by a housing wall that together define the cavity.

Example 44 is the method of example 43, the method further including attaching a top lid that engages with the housing wall to enclose the cavity.

Example 45 is the method of any of examples 38 to 44, wherein the spacer includes a plastic, a foam, and/or an insulating epoxy.

Example 46 is the method of any of examples 38 to 45, wherein the metal layer is perforated.

Example 47 is the method of any of examples 38 to 46, wherein the housing is perforated.

Example 48 is the method of any of examples 38 to 47, wherein the antenna further includes a radio frequency (RF) port configured to connect to an antenna port of a wireless transceiver.

Example 49 is the method of any of examples 38 to 48, wherein the antenna includes a Wi-Fi antenna (e.g., a WiFi 6e antenna).

Example 50 is the method of any of examples 38 to 49, wherein the antenna is configured to transmit and/or receive RF signals in a frequency range of 5-7 GHZ (e.g., the Wi-Fi 5 and 6E band).

Example 51 is the method of any of examples 38 to 50, wherein the wireless transceiver is a Wi-Fi transceiver (e.g., WiFi 6e).

Example 52 is the method of any of examples 38 to 51, wherein forming the housing includes forming a housing base surrounded by a housing wall that together define the cavity, wherein the housing base has a length and a width that together total at least about 80 mm.

Example 53 is the method of example 52, wherein the length is about 40 mm and the width is about 40 mm.

Example 54 is the method of example 52, wherein the length is about 30 mm and the width is about 50 mm.

Example 55 is the method of any of examples 38 to 54, the method further including attaching a mounting device to the housing for removably attaching the housing to a metal chassis of a computing system.

Example 56 is the method of example 55, wherein the mounting device includes a screw, a hook, a bolt, a press-fit, or an adhesive.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. An apparatus comprising:

a housing formed from an insulating material;

a metal layer arranged within a cavity of the housing;

an antenna comprising a ground terminal and an antenna body, wherein the ground terminal is connected to the metal layer, wherein the antenna body is arranged above the metal layer and within the cavity; and a spacer between the metal layer and the antenna body that provides an offset distance between the metal layer and the antenna body.

2. The apparatus of claim 1, wherein the metal layer further includes a metal wall connected to and surrounding the metal layer.

3. The apparatus of claim 2, wherein a height of the metal wall is at least as long as the offset distance.

4. The apparatus of claim 3, wherein the height of the metal wall is about 5 mm and the offset distance is about 5 mm.

5. The apparatus of claim 1, wherein the housing comprises a housing base surrounded by a housing wall that together define the cavity, wherein the housing further comprises a top lid that engages with the housing wall to enclose the cavity.

6. The apparatus of claim 1, wherein the spacer comprises a plastic, a foam, and/or an insulating epoxy.

7. The apparatus of claim 1, wherein the metal layer or housing is perforated.

8. The apparatus of claim 1, wherein the antenna further comprises a radio frequency (RF) port configured to connect to an antenna port of a wireless transceiver.

9. The apparatus of claim 1, wherein the housing comprises a housing base surrounded by a housing wall that together define the cavity, wherein the housing base has a length and a width that together total at least about 80 mm.

10. The apparatus of claim 9, wherein the length is about 40 mm and the width is about 40 mm.

11. The apparatus of claim 1, the apparatus further comprising a mounting device configured to removably attach the housing to a metal chassis of the computing system.

12. The apparatus of any claim 11, wherein the mounting device comprises a screw, a hook, a bolt, a press-fit, or an adhesive.

13. A computing system comprising:

a computing device comprising a housing and a wireless transceiver, wherein the housing surrounds the wireless transceiver and comprises a metal chassis;

an external antenna device that is external to the housing, wherein the wireless transceiver comprises a radio frequency (RF) antenna port configured to connect to the external antenna device at the metal chassis, wherein the external antenna device comprises:

an insulating housing configured to attach to the metal chassis;

a metal layer arranged within a cavity of the insulating housing, wherein the metal layer is separated from the metal chassis by a base of the insulating housing, wherein the base is surround by a wall that together define the cavity of the insulating housing;

an antenna comprising a ground terminal and an antenna body, wherein the ground terminal is connected to the metal layer, wherein the antenna body is arranged above the metal layer and within the cavity; and a spacer between the metal layer and the antenna body that provides an offset distance between the metal layer and the antenna body.

14. The computing system of claim 13, wherein the metal layer further includes a metal wall connected to and surrounding the metal layer, wherein a height of the metal wall is at least as long as the offset distance.

15. The computing system of claim 13, wherein the insulating housing further comprises a top lid that engages with the wall to enclose the cavity.

16. The computing system of claim 13, wherein the antenna further comprises a radio frequency (RF) port configured to connect to the RF antenna port of the wireless transceiver.

17. The computing system of claim 13, wherein the antenna comprises a Wi-Fi antenna.

18. The computing system of claim 13, wherein the antenna is configured to transmit and/or receive RF signals from the wireless transceiver in a frequency range of 5-7 GHz.

19. The computing system of claim 13, wherein the wireless transceiver is a Wi-Fi 6e transceiver.

20. The computing system of claim 13, wherein the external antenna device further comprises a mounting device configured to removably attach the insulating housing to the metal chassis.

* * * * *